United States Patent [19]
Blanc et al.

[11] Patent Number: 5,755,149
[45] Date of Patent: May 26, 1998

[54] AUTOMATIC MACHINE FOR THE PREPARATION OF HOT BEVERAGE INFUSIONS

[75] Inventors: Jean Pierre Blanc, Gattieres; Christian Ferrier, La Trinite, both of France

[73] Assignee: Compagnie Mediterraneenne des Cafes S.A., Carros, France

[21] Appl. No.: 663,229

[22] PCT Filed: Dec. 13, 1994

[86] PCT No.: PCT/FR94/01455

§ 371 Date: Jun. 17, 1996

§ 102(e) Date: Jun. 17, 1996

[87] PCT Pub. No.: WO95/17121

PCT Pub. Date: Jun. 29, 1995

[30] Foreign Application Priority Data

Dec. 20, 1993 [FR] France ................ 93 15677
Aug. 10, 1994 [FR] France ................ 94 10087

[51] Int. Cl.⁶ .................................................. A47J 31/40
[52] U.S. Cl. ........................ 99/289 T; 99/295; 99/302 P
[58] Field of Search ....................... 99/289 T, 289 R, 99/295, 302 P; 426/433

[56] References Cited

U.S. PATENT DOCUMENTS 2,952,202  9/1960  Renner et al. ................ 99/289
3,143,955  8/1964  Rockwell ...................... 99/289
3,269,298  8/1966  Grundmann .................. 99/289
4,253,385  3/1981  Illy ............................ 99/295 X
4,429,623  2/1984  Illy ............................ 99/295

FOREIGN PATENT DOCUMENTS 0041931   6/1981   European Pat. Off. .
0093366   11/1983  European Pat. Off. .
0208092   1/1987   European Pat. Off. .
1216342   4/1960   France .
1575181   7/1969   France .
2435436   2/1976   Germany .

*Primary Examiner*—Reginald L. Alexander
*Attorney, Agent, or Firm*—Young & Thompson

[57] ABSTRACT

The automatic machine for the preparation of hot beverage infusions such as coffee being formed by a group formed of a body facing a boiler intended to be brought closer to each other in order to form an infusion chamber. The machine having, between the body and the boiler, at the infusion chamber: reception members intended to receive an individual package containing the product to be infused, the reception members being intended to secure temporarily the package between the body and the boiler; a position fixing element for guiding and maintaining the package in a vertical position when the reception members are present; and an automatic ejection member which ejects the package simply by gravity, the displacement of the package being perpendicular to the axis of the machine.

25 Claims, 13 Drawing Sheets

5,755,149

AUTOMATIC MACHINE FOR THE PREPARATION OF HOT BEVERAGE INFUSIONS

FIELD OF THE INVENTION

The present invention relates to an automatic machine permitting the preparation of hot beverage infusions such as coffee.

This machine comprises a group which is comprised by a fixed piston and a movable cylindrical body, the group being disposed in juxtaposition to a boiler.

The boiler, on the one hand, the fixed piston and the movable body on the other hand, are separated by a region in which are positioned reception means, for maintaining in position and for the feeding of packages.

BACKGROUND OF THE INVENTION

Such machines are already described in the prior art.

U.S. Pat. No. 3,143,955 provides a machine for the preparation of beverages which comprises essentially mechanisms, package as reception means, for maintaining in position and for delivery, such as a drum on which is rolled up a strip comprising longitudinally a plurality of packages of products to be infused.

SUMMARY OF THE INVENTION

The difference from the present invention resides in the structure of the various means as well as in the use of a strip of packages and not of individual packages. The essential drawback of the strip consists in the presence in the machine, both of used and new packages, which gives rise to problems of cleanliness.

DE-A-2,435,436 relates to an automatic machine for the preparation of infusions of coffee or tea. The movement between the two principal portions of the machine, adapted to be brought together to permit percolation, is ensured by a rotating cam against which is mounted a housing. This housing, according to the invention, provides means for wetting the substance to be infused.

Nevertheless, these wetting means comprise a number of pieces. The construction is thus more difficult and the effectiveness of the rubber disc which closes the perforations of the drum, can be altered by the heat due to percolation.

EP-A-0 093 366 relates to a coffee machine whose technical characteristics are similar to the invention as to the assembly of the movable cylindrical body-fixed piston with boiler and to U.S. Pat. No. 3,143,955 as to the nature of the packages, which are in the form of a strip.

Contrary to these documents, the invention uses, in the extraction group, a product to be infused which is used with individual packages and whose cleaning as well as use of the group are facilitated. Removal of the package and of the product to be infused is automatic.

To this end, the present invention provides an automatic machine for the preparation of hot beverage infusions such as coffee, which comprises a group comprised by a body disposed facing a boiler, adapted to be brought together with each other to comprise an infusion chamber, characterized by the fact that it comprises between the body and the boiler, at the infusion chamber:

reception means for an individual package containing the product to be infused, which are constituted by at least one retractable element, deployed in substantially lower position, adapted to immobilize temporarily said package between the body and the boiler, means for maintaining the package in position which are constituted by two substantially vertical lateral grooves, in which said package slides and is maintained vertical position when the reception means are present, and automatic ejection means of said package which are constituted of the retractable element which is retracted relative to the passage for the individual package, to permit the ejection by mere gravity of the individual package, the displacement of the individual package being perpendicular to the axis of the machine.

On the one hand, the infusion chamber is constituted by two half recesses, one carried by the surface of the body, the other carried by the surface of the boiler, these two surfaces facing each other; said infusion chamber is formed when the two half recesses are juxtaposed. On the other hand, the sealing means are carried by the individual package of the product to be infused such that, when the infusion chamber is formed, the individual package is inserted between the two half recesses.

The automatic machine uses packages of products to be infused, of the individual package type, comprised by a central flexible portion enclosing the product to be infused and a peripheral portion forming a sealing and rigidifying edge; it is characterized by the fact that the peripheral portion of said package serves as sealing means between the half recess of the body and the half recess of the boiler when these are brought together.

The body and the boiler are each provided with a plate package as a filter at their respective half recesses; these filters have a shape which permits partially or completely inserting the central portion of the package, when the infusion chamber is formed.

The automatic machine comprises wetting means located at the body toward the half recess, which are formed by the filter of the half recess of the body, and by a membrane valve disposed in the space comprised between said half recess of the body and said filter.

The filter of the body is pierced transversely by at least one hole and comprises, against its surface oriented in the direction of said body, the valve membrane whose concavity forms a space delimited by said filter, the assembly of the holes opening into this space.

The membrane valve is movable between two positions, a concave position preventing the passage of the infused liquid, and the other plane permitting the passage of said infused liquid according to the pressure which is applied to it.

The half recess of the body is provided with an evacuation conduit for infused liquid whose opening is disposed between said half recess and the membrane valve.

The retractable element is an abutment forming, in the extended position, the reception means, and, in the retracted position, the automatic ejection means for the package by simple gravity, the element being mounted on a guided axle, against the force of a return spring; the free end of the guided axle coacts with a control cam mounted against the action of a spring.

The means for maintaining in position the package are secured to at least one axle, mounted under spring action, said spring maintains the maintaining means midway between the body and the boiler so as to unstick said package, when the spacing between said body and said boiler is at a maximum.

The body of the machine comprises a chamber, in which a fixed piston is present, the body being movable relative to the fixed piston, characterized by the fact that said body has a water inlet and outlet conduit opening into the chamber, such that the group formed by the body and the fixed piston form a simple jack effect which decreases or increases the volume of the chamber by the outflow or inflow of water via the conduit, which spaces or brings together horizontally the body of the boiler.

The fixed position is provided with an abutment which coacts with the control cam when the chamber is of minimum size, such that the reception means are armed and the automatic ejection means are disarmed, which is to say that the retractable abutment is in extended position permitting the reception of a new package.

The boiler is provided with an abutment which serves as a buffer for the rejection means, when the body and the boiler approach each other, such that said reception means are disarmed and the automatic ejection means are armed, which is to say that the retractable abutment takes a retracted position.

The half recess of the body and/or the half recess of the boiler are provided with a flexible element, which absorbs the variations of volume of the package.

The body and the boiler are disposed along a substantially horizontal longitudinal axis.

The invention also relates to an automatic machine for the preparation of hot beverage infusions such as coffee, which comprises a group formed by a body disposed facing a boiler, the body and the boiler being disposed along a horizontal axis, and adapted to be reversibly brought together with each other to form an infusion chamber, at which are present the means for receiving, maintaining in position and automatically ejecting an individual package containing the product to be infused, characterized by the fact that the body or the heater is provided with a rotatably movable abutment about at least one substantially horizontal axis and perpendicular to the longitudinal axis of the body-boiler assembly; the abutment is located at the infusion chamber and is movable between:

a position in the plane of said chamber, the abutment package as reception means for the package, and a position outside the plane of the infusion chamber, said abutment then package as ejection means for said package.

The abutment is constituted by a stirrup which comprises two lateral substantially vertical uprights which coact each with an articulation axle, and which are connected to each other by a crosspiece which receives the package when the abutment is in the plane of the infusion chamber.

Means for maintaining in position a package are present at the abutment and guide substantially vertically from above downwardly, said package.

The means for maintaining in position are comprised by two vertical grooved elements, in which the package slides and is maintained in vertical position, each element being disposed on opposite sides of the infusion chamber.

The abutment comprises at least one control cam which coacts with the body or the boiler when these latter approach each other, the control cam controlling the abutment during the movement from the position in the plane to the position outside the plane of the infusion chamber, the reverse movement taking place by simple gravity when said body and said boiler separate from each other.

The abutment comprises at least one tongue carrying a wedge which coacts with the body or the boiler, upon separation of said body and said boiler, which retards the automatic return of the abutment into position in the plane of the infusion chamber and facilitates ejection of the package.

The free end of the wedge is slanted, and the body or the boiler of the machine is provided with a slanted wing, the slanted portions of said wedge and of the wing coacting to facilitate the passage of the abutment into the position outside the plane of the infusion chamber, and to prevent the passage of the abutment into position in said plane.

A flap is movable in rotation, about at least one substantially horizontal axis perpendicular to the longitudinal axis of the machine, between a position in the plane of the infusion chamber, preventing introduction of a new package, and a position outside the plane permitting introduction of the new package.

The axis of rotation of the abutment and the axis of rotation of the flap are coaxial.

The body is removable from the boiler.

BRIEF DESCRIPTION OF THE DRAWINGS

The accompanying drawings are given by way of non-limiting examples. They show several preferred embodiments of the invention. They permit easy comprehension of the invention.

Finally.

DETAILED DESCRIPTION OF THE PREFERRED EMBODIMENTS

The present invention relates to an automatic machine for the preparation of hot beverage infusions such as coffee.

Figure 1:
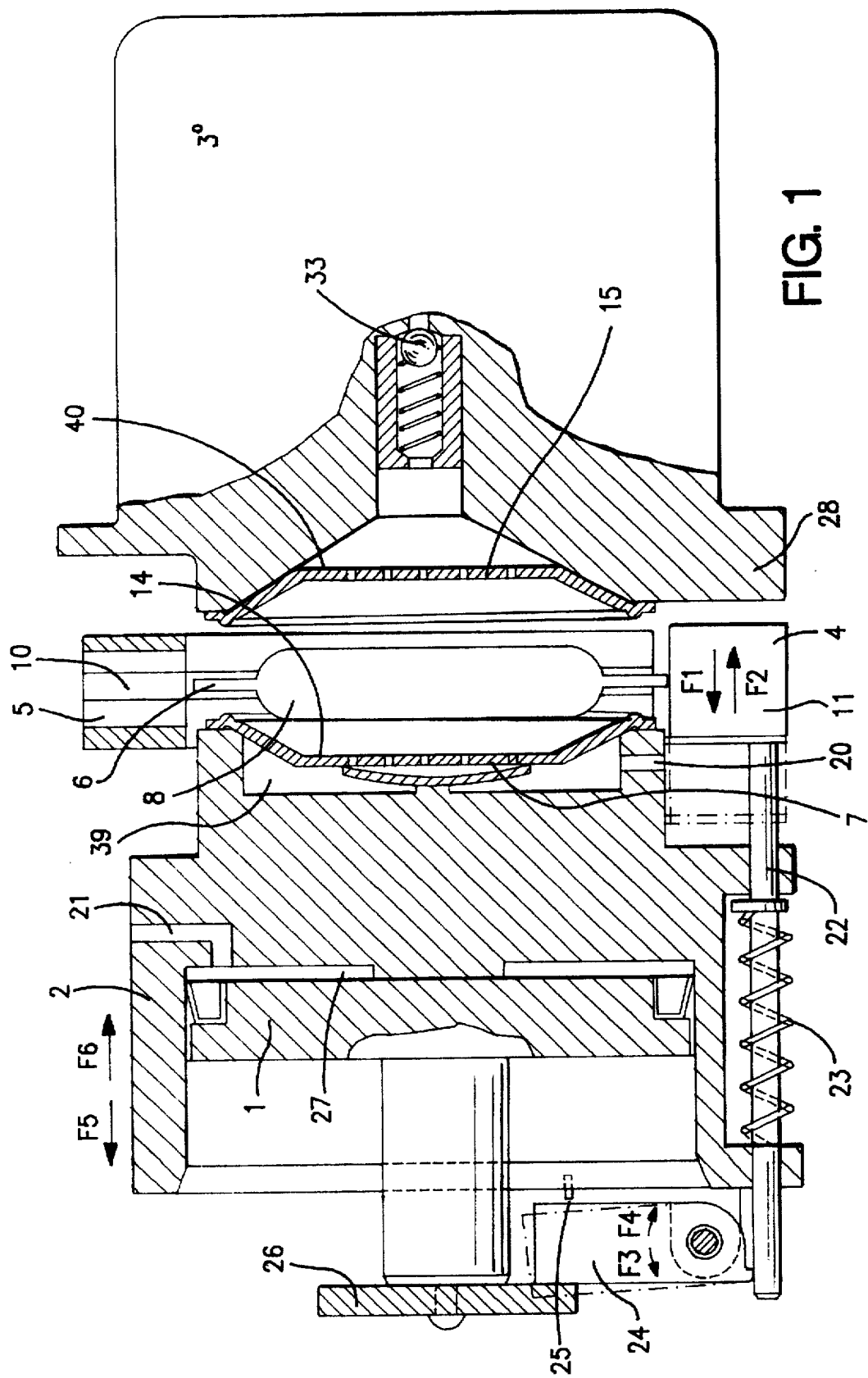
FIG. 1 shows a side schematic view in partial cross section of an embodiment of the invention.
Figure 10:
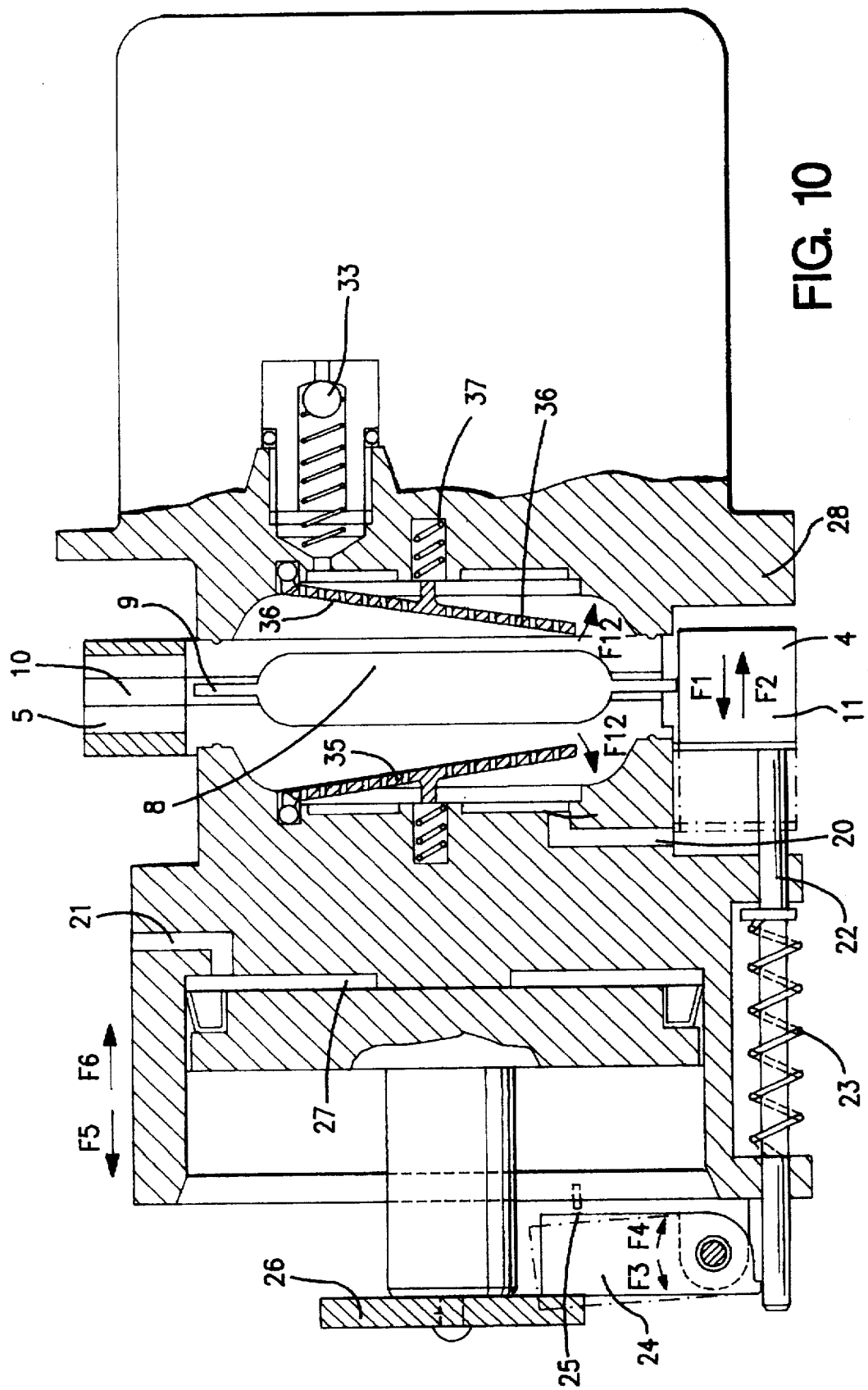
FIG. 10 shows a lateral schematic view in partial cross section of another embodiment of the invention.
Figure 13:
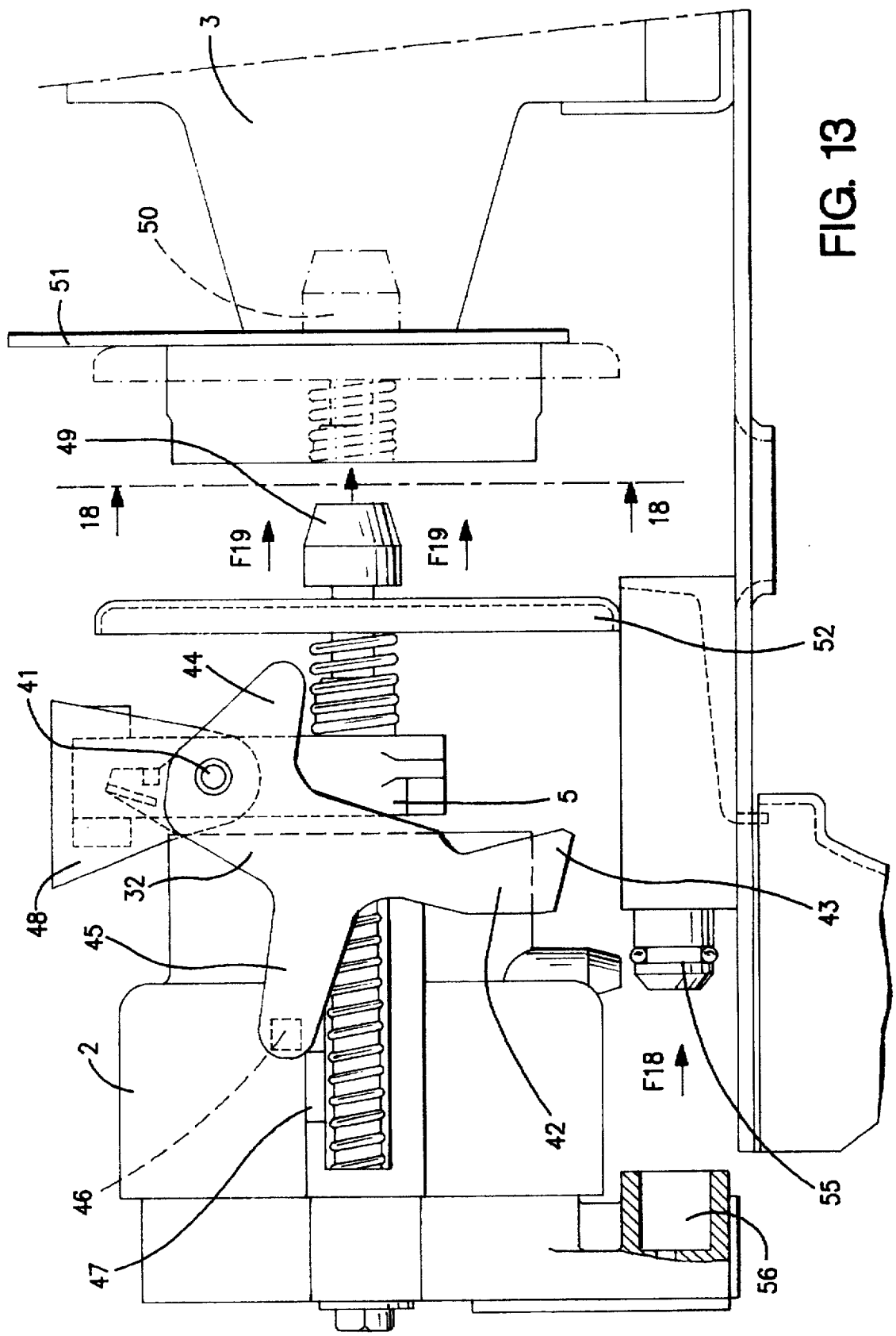
FIG. 13 shows a fragmentary side view of the machine according to the invention, and more particularly of the structural environment of the means for receiving, maintaining and positioning and automatic ejection, and the coaction between the body and the boiler which constitutes said machine.

This machine is shown in FIGS. 1, 10 and 13 in the form of three different embodiments.

The first embodiment is shown in FIG. 1, and comprises a group formed by a fixed piston 1 and a cylindrical body 2 movable relative to the fixed piston 1.

Figure 9:
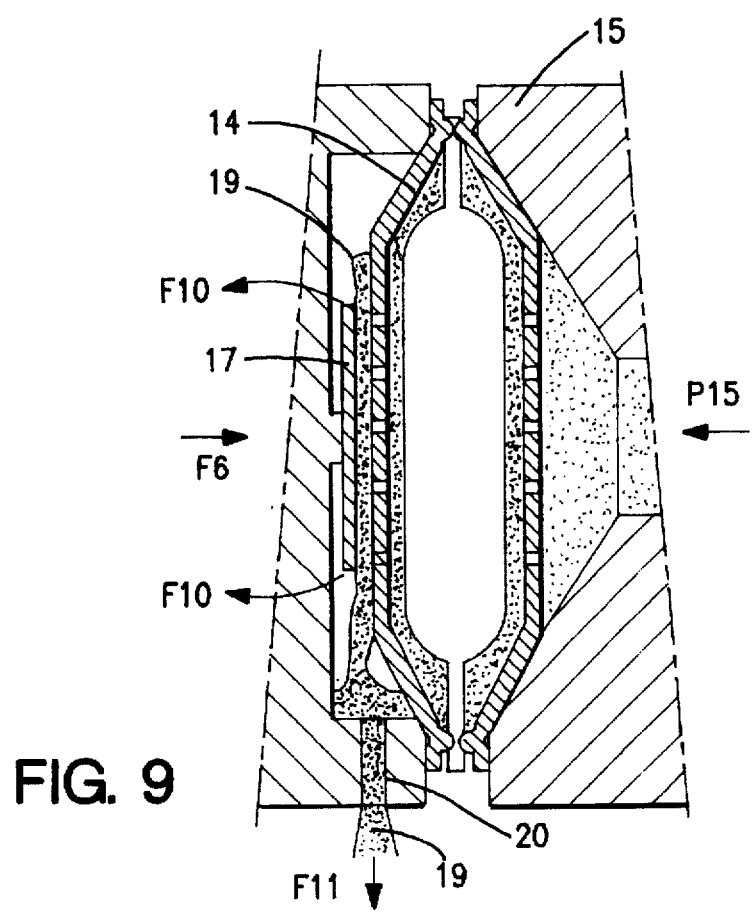
FIG. 9 shows a view identical to FIG. 8, in which, in contrast to the preceding figure, the membrane valve has changed in shape, under the force of the pressure of the water from the boiler which has increased, the infused liquid can then flow through the outlet conduit.

This movable cylindrical body 2 has an outlet conduit 20 for the infused liquid 19, as is shown in FIG. 9.

This group comprised by the fixed piston 1 and the movable cylindrical body 2 is placed in juxtaposition with a boiler 3.

The group 1 and 2 and the boiler 3 are in horizontal position and group 1 and 2 can approach boiler 3 horizontally.

This automatic machine is characterized by an assembly of means making it new and inventive.

There is reception means 4, automatic ejection means 4 and means 5 for maintaining in position, provided for a package 6 containing the product 8 to be infused.

These means will be described in detail hereinafter.

There is also sealing means 13 present between the body 2 and the package 6, on the one hand, and the boiler 3 and said package 6, on the other hand, and more precisely between the two half recesses 39 and 40 facing each other, 39 being disposed on the body 2, and 40 being disposed on the boiler 3.

Finally there are wetting means 7 for said product 8 to be infused, before extraction.

These means will also be described in detail hereinafter.

Figure 2:
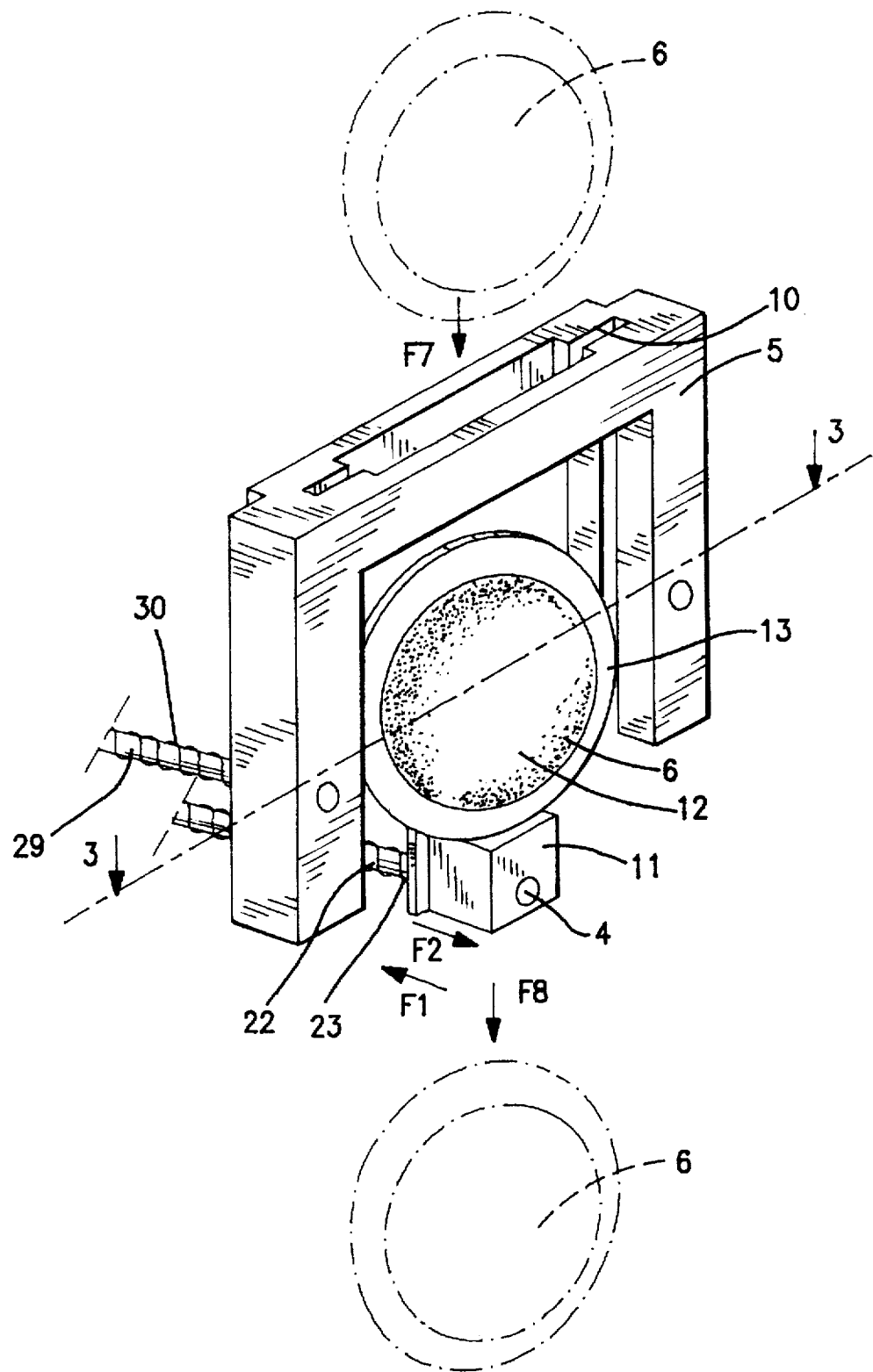
FIG. 2 shows in perspective the reception means and means for maintaining in position, as well as the movements in and out of the package of the product to be infused.

As is seen in FIG. 2, the reception means 4 and the automatic ejection means 4 are constituted by a same and single retractable abutment 11, movable according to arrows F1 and F2.

The latter is disposed in lower position. It is adapted to immobilize temporarily a package 6 of the product 8 to be infused when there is maximum spacing between the group comprising the fixed piston 1 and the movable cylindrical body 2, and the boiler 3, which is to say when the body 2 is displaced horizontally along F5, of FIGS. 1 and 10, relatively to the boiler 3. The abutment 11 then constitutes the reception means 4 when its position is due to movement along F2, and which permits stopping the entry along F7 of the package 6. This stopping takes place facing the two half recesses 39 and 40.

After the infusion or lixiviation has taken place, the abutment 11 retracts along F1, thereby forming the automatic ejection means 4, which permits discharge by simple gravity of the used package 6 along the arrow F8.

The means 5 for maintaining in position are, for their part, constituted by two lateral grooves 10 in vertical position, in which the package 6 of the product 8 to be infused slides vertically.

These are lateral grooves 10 which permit the package 6 to rest in substantially vertical position so that it will be located in a position substantially parallel to the two half recesses 39 and 40, which coact together to grip the package 6.

The package 6 containing the product 8 to be infused is of disc shape, formed essentially by a flexible central portion 12 enclosing the product 8 to be infused and a peripheral portion 13 forming an edge for sealing and rigidification.

Such a package 6 has already been the object of a patent application by the applicant. This application has been registered under Ser. No. 9,310,760, Sep. 6, 1993.

The use of such a package 6 takes place within automatic machines which comprise the group formed by the fixed piston 1 and the movable cylindrical body 2 as well as by the boiler 3. Without departing from the scope of the invention, the boiler could be movable in that the piston could be movable by use of a fixed piston, the body then being fixed.

The group 1 and 2 as well as the boiler 3 are each provided with a plate package as a filter 14 or 15 disposed each within one of the half recesses 39 and 40.

The filter 14 is positioned in the half recess 39 at the group 1 and 2, whilst the filter 15 is positioned in the half recess 40, at the boiler 3.

These filters 14 and 15 have a position facing each other, and have a shape which permits entirely enclosing the central portion 12 of the package 6 when the body 2 is brought together with the boiler 3. In this position, the two half recesses 39 and 40 form the infusion chamber 38.

The peripheral portion 13 of said package 6 then serves as sealing means between the filter 14 of the body 2 and the filter 15 of the boiler 3, when the latter 14 and 15 are brought together, along F6, as is shown in FIGS. 1 and 10.

As is seen in FIGS. 6–9, the filter 14 of the movable cylindrical body 2, pierced transversely by several holes 16, comprises, against its surface oriented toward said body 2, a membrane valve 17 whose concave shape delimits a space 18 with the aid of the said filter 14.

The filter 15 is also pierced by holes.

The assembly of the holes 16 of the filter 14 opens into this space 18.

It is in this position that lixiviation can commence.

The boiler 3 heats the water that it contains, from the valve for example (not shown in the drawings).

When the pressure is sufficient, a valve 33 opens to permit the passage of the hot water into the interior of the infusion chamber 38 where the package 6 is located. This is shown in FIG. 8.

Figure 8:
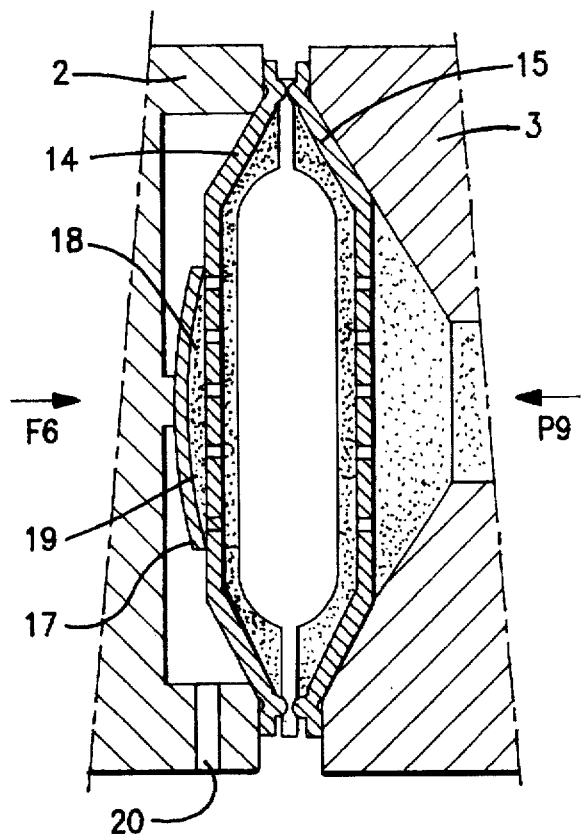
FIG. 8 shows a view identical to FIG. 7 with the difference that the water heated by the boiler wets the product to be infused contained in the package; the membrane valve, coacting with the filter of the movable cylindrical body, prevents the passage of the infused liquid.

The membrane valve 17 is movable between two positions, a concave position shown in FIG. 8, which prevents the passage of the infused liquid 19, and the other plane, as shown in FIG. 9, permitting the passage of said infused liquid 19; the change in shape of the membrane valve 17 is a function of the pressure applied to it by means of the infused liquid 19.

If this pressure is low, as seen in FIG. 8, along arrow P9, the membrane valve 17 does not deform.

By contrast, if the pressure increases according to arrow P15 of FIG. 9, the membrane valve 17 deforms along F10, which permits the passage of the infused liquid 19 through the outlet conduit 20, according to arrow F11.

This arrangement thus permits wetting the product 8 to be infused present within the package 6.

The wetting means 7 are therefore comprised by the filter 14 of the movable cylindrical body 2 and by the membrane valve 17, as well as by the arrangement of the holes 16 of the filter 14 located facing the membrane valve 17.

According to FIGS. 1 and 10, the movable cylindrical body 2 has a conduit 21 which serves to permit inlet and outlet of the water from for example the valve, not shown.

The opening of the interior of this conduit 21 is disposed in the chamber 27 of the movable cylindrical body 2, this chamber 27 is delimited by the fixed piston 1, such that the group 1 and 2 comprises a simple jack, which decreases the spacing between the two filters 14 and 15 when the water enters the chamber 27, and which increases this spacing when the water leaves.

It is thus the movement according to F5 or F6 of the movable cylindrical body 2 relative to the fixed piston 1, which permits the gripping of the package 6 between the two filters 14 and 15.

The retractable abutment 11, which forms means for receiving and means for automatic ejection 4, as is shown in FIGS. 1, 2 and 10, is mounted on a guided sliding axle 22 between two bearings secured to the movable cylindrical body 2, against the force of a return spring 23. This guided sliding axle 22 is parallel to the axis of displacement of the movable cylindrical body 2.

The free end of the guided axle 22 coacts with a control cam 24, also mounted against the force of a spring 25.

This control cam 24 is mounted in rotation according to the arrows F3 and F4, as is shown in FIGS. 1 and 8.

Again in these same figures, the fixed piston 1 is provided with an abutment 26 which coacts with the control cam 24 when the space 27, comprised between the fixed piston 1 and the movable cylindrical body 2, is at a minimum, such that the cam 24 will no longer act on the axle 22, but permits the retractable abutment 11 to take a deployed position under the force of spring 23, thereby forming the reception means 4.

This deployed position permits the reception of a fresh package 6. This corresponds to the arrow F2.

To effect the reverse movement, the boiler 3 is provided with an abutment 28, against which the abutment 11 comes to bear and returns to withdrawn position according to arrow F1 under the force of the approach of the body 2 relative to the boiler 3. This movement takes place when the chamber 27 of the group 1 and 2 increases in volume under the influence of the entry of water from the conduit 21, which permits the forced retraction of the abutment 11, thereby providing the automatic ejection means 4.

This permits the discharge by simple gravity of the used package 6.

Figure 3:
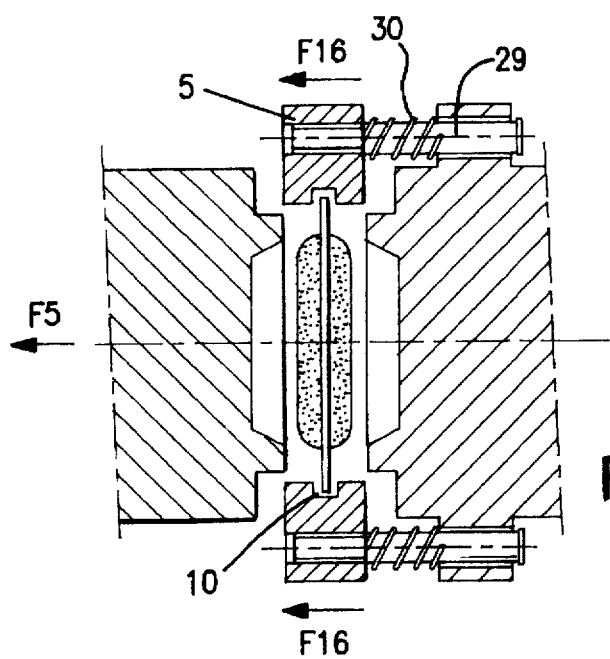
FIG. 3 is a view in transverse cross section on the line 3—3 of FIG. 2, when the package is positioned to be used, and when the body and the boiler are spaced from each other the farthest.
Figure 4:
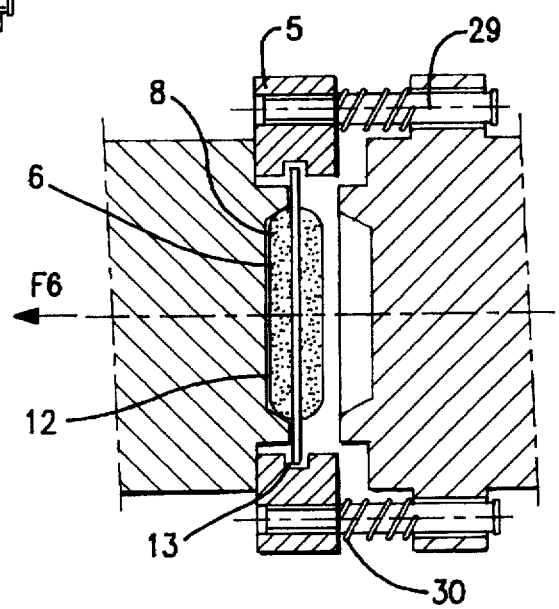
FIG. 4 shows a view identical to that of FIG. 3, but in which the package is positioned against the body which approaches the boiler.
Figure 5:
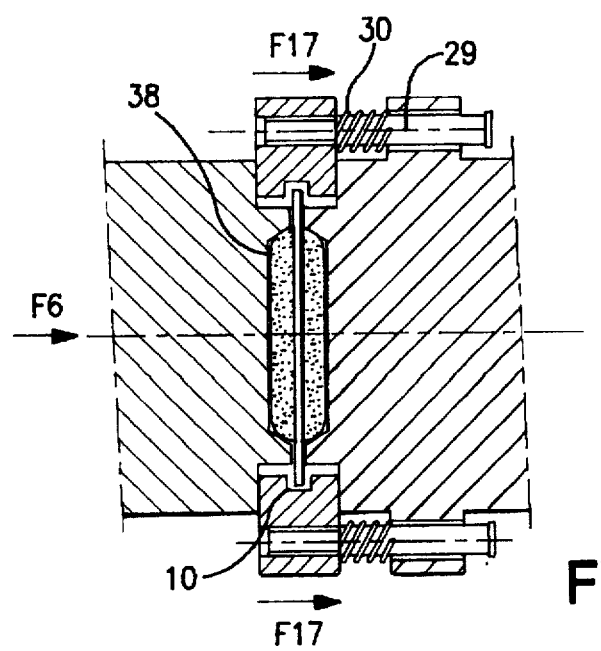
FIG. 5 shows the same view as in FIGS. 3 and 4 but in which the displacement of the body is completed, such that the package is wedged between said body and said boiler.
Figure 6:
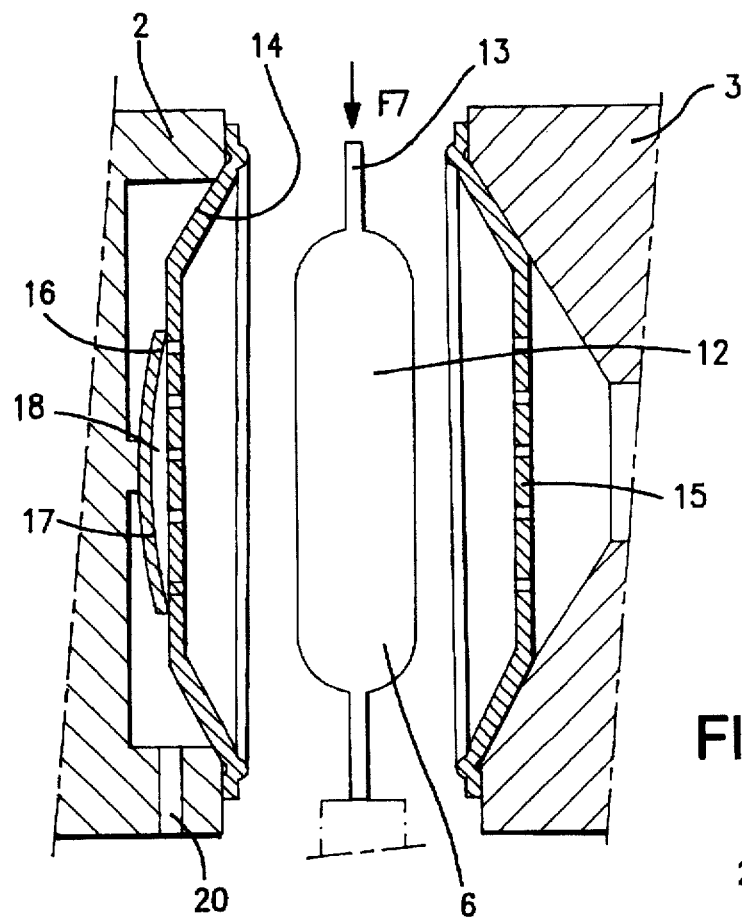
FIG. 6 shows a view in longitudinal cross section of a detail of FIG. 1, when the package enters the interior of the automatic machine; said package is maintained in position and is located partially surrounded by the two filters facing each other.
Figure 7:
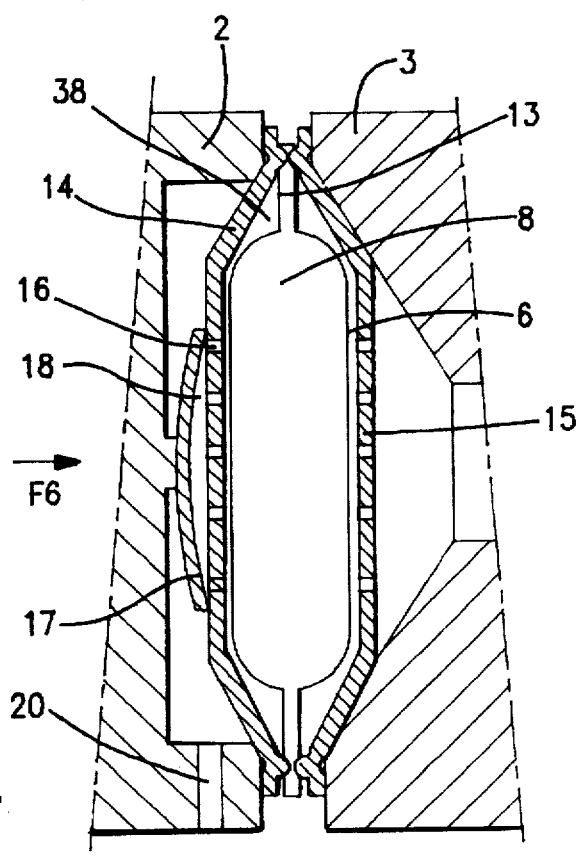
FIG. 7 shows the same view as in FIG. 6, but in which the two filters are brought together under the action of the fixed position and of the movable cylindrical body; the package is then almost completely surrounded between said filters, only its periphery serves as a sealing joint between these two filters.

As is seen in FIGS. 3, 4 and 5, the lateral grooves 10, which form the means 5 for maintaining in position, are secured to at least one axle 29 mounted against the force of a spring 30 which maintains the lateral grooves 10 midway between the two filters 14 and 15, when the spacing between the group 1 and 2, and the boiler 3, is at a maximum, as is shown in FIG. 3, such that the used package 6 is unstuck from said filters 14 and 15 and can be discharged when the subjacent abutment 11 is withdrawn.

The lateral grooves 10, the axles 29 and the springs 30 form in combination the unsticking means for the used packages 6.

If these means were not present, it would be impossible for the used packages 6, which are wet, to be discharged by simple gravity. The lateral grooves 10 are, in rest position, midway between the body 2 and the boiler 3. When said body 2 approaches along F6 toward said boiler 3, the body 2 enters first into contact with the package 6, without the axles 29 and the springs 30 being used. This is shown in FIG. 4. This movement along F6 takes place when the body 6 moves with it said package 6 as well as the lateral grooves 5 against the force of springs 30, along F16, until it contacts the boiler 3, as is shown in FIG. 5.

Upon reverse movement, along F5, the springs 30, the axles 29 and the lateral grooves 5 coact to return to their original position, in which the package 6 is disposed substantially midway between the body 2 and the boiler 3. Said package 6 is then unstuck, because the lateral grooves 5 are movable along F17 under the action of the springs 30.

Figure 11:
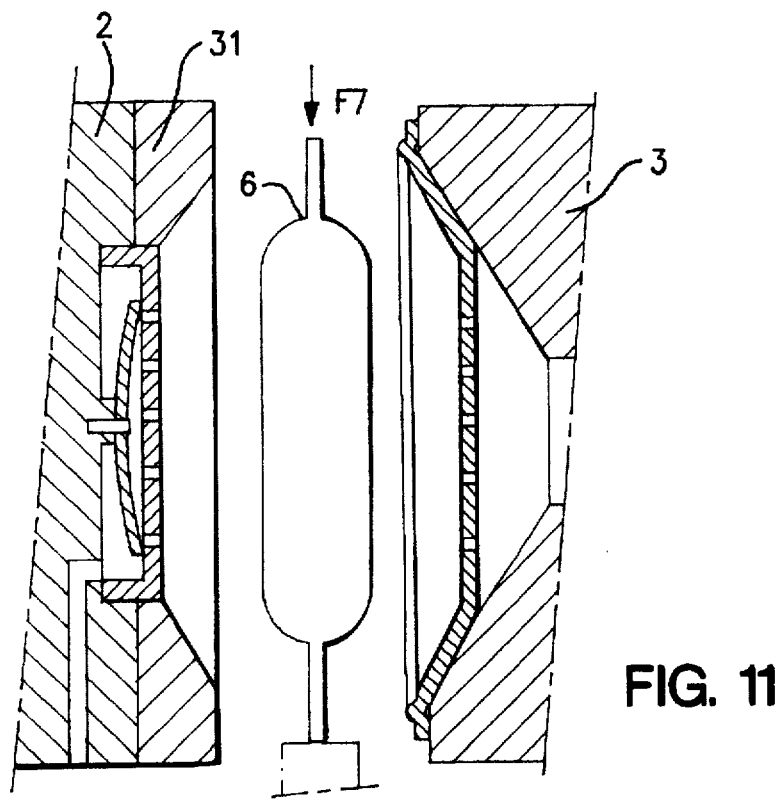
FIG. 11 shows a view in longitudinal cross section of a detail corresponding to that of FIGS. 6–9, but in which the fixed piston-movable cylindrical body group is provided with a sealing joint disposed facing the periphery of the package.
Figure 12:
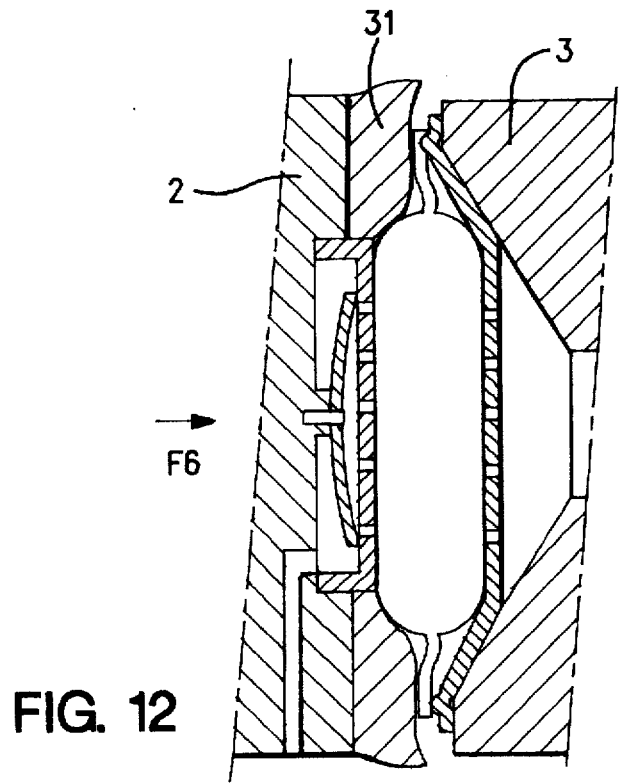
FIG. 12 shows a view identical to that of FIG. 11, in which the movable cylindrical body is brought toward the boiler under the force of the fixed piston, such that the joint comes into contact with the periphery of the package and applies said periphery against the boiler.

According to another embodiment shown in FIGS. 11 and 12, the half recess of the fixed piston-movable cylindrical body group comprises a flexible element 31, which permits absorbing variations in volume of the packages 6, which are either poorly measured or of a different nature from those usually used.

The latter 31 is complementary to the rigid peripheral portion 13 of the package 6 which ensures sealing between the package 6 and the body 2, on the one hand, and the boiler 3, on the other hand.

The second embodiment in shown in FIG. 10, in which the group 1 and 2 and the boiler 3 are provided with two filters 35 and 36 mounted pivotally along F12 against the action of springs 37, which facilitate the unsticking of the used package 6.

The unsticking means are therefore different from those shown in FIGS. 3–5, corresponding to the embodiment of FIG. 1.

In this case, the means 5 for maintaining in position, as well as for reception and automatic ejection 4, are no longer absolutely necessary.

For simplification, the wetting means 7, and more particularly the membrane valve 17, are not shown in this figure. A third embodiment concerns an automatic machine for the preparation of hot beverage infusions such as coffee.

This machine is shown in FIGS. 13–17.

In a conventional way, said machine comprises a group formed on the one hand by a body 2 disposed facing a boiler 3.

The body and the boiler are disposed along a horizontal axis and are adapted to be brought together, along arrow F6, then to be spaced apart, along arrow F13.

FIG. 13 shows the automatic machine at rest, whilst FIGS. 14–17 show this same machine in the different positions permitting lixiviation.

Figure 14:
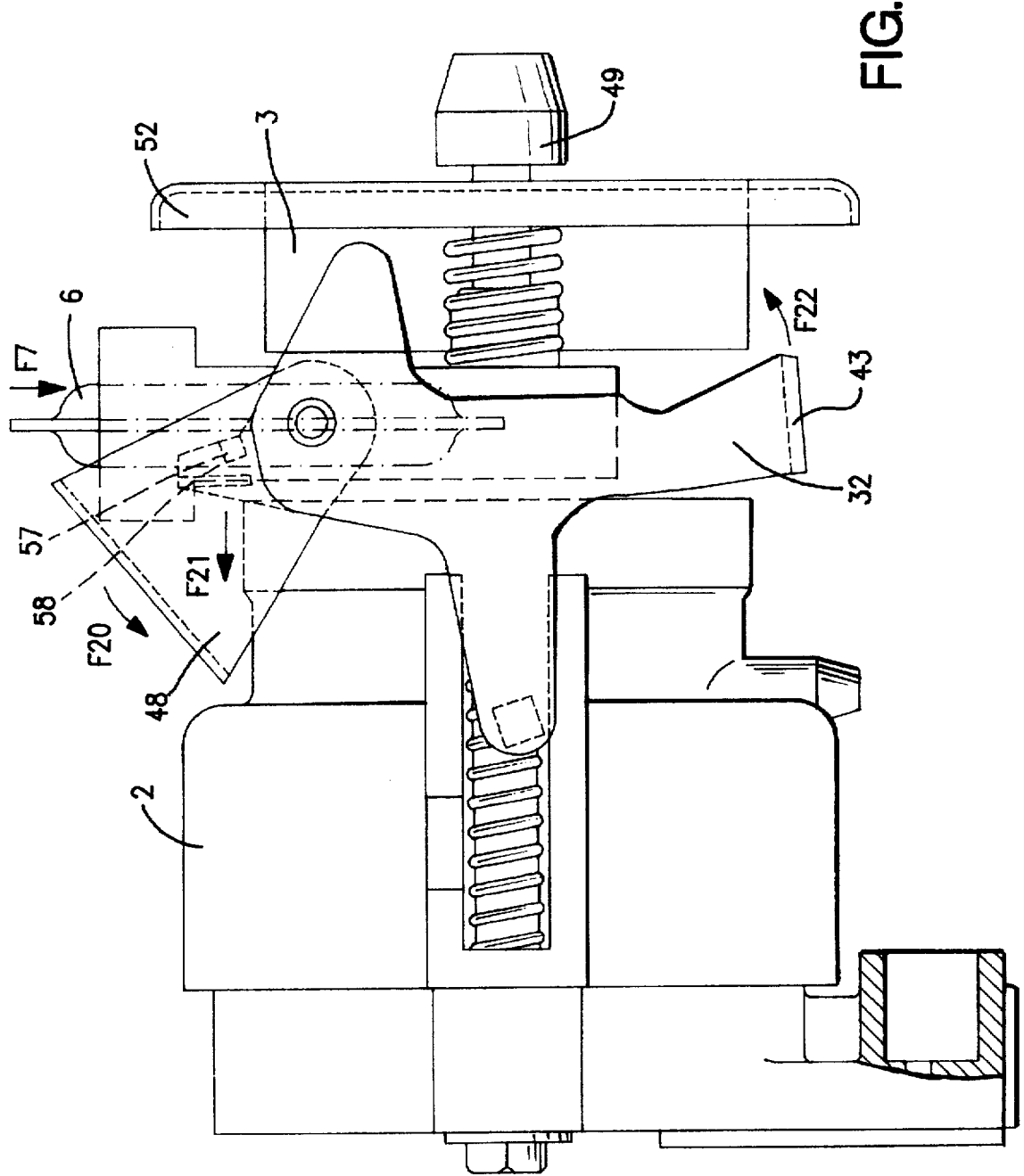
FIG. 14 shows a side view of the means for receiving, maintaining in position and ejecting during introduction of the package into said means.

In FIG. 14, there is introduced a package 6 containing the product to be infused, along arrow F7.

Figure 15:
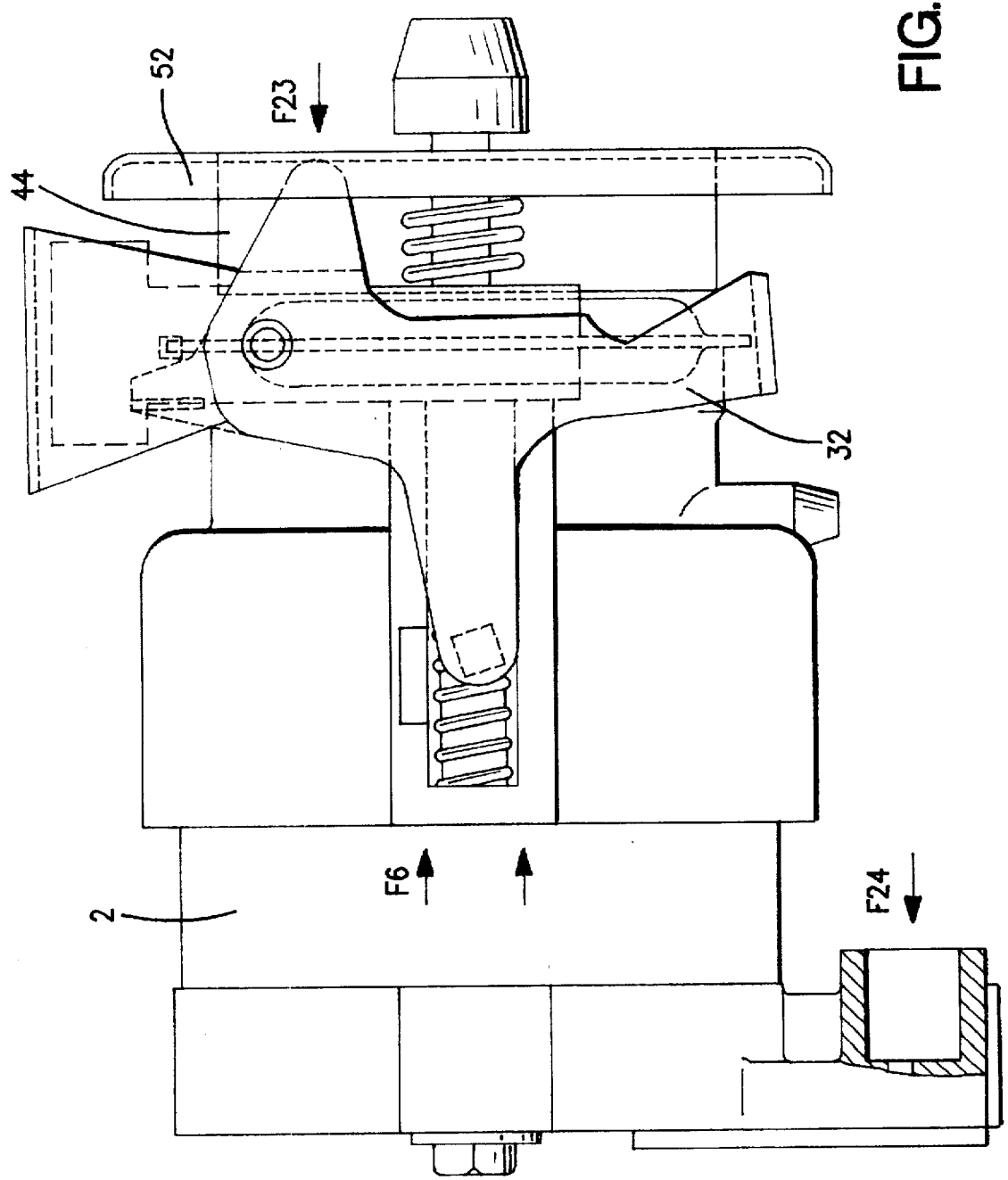
FIG. 15 shows a side view identical to FIG. 14, in which the body approaches the boiler, the package being in reception position and being maintained in position.

In FIG. 15, the body 2 and the boiler 3 approach each other, along F6.

Figure 16:
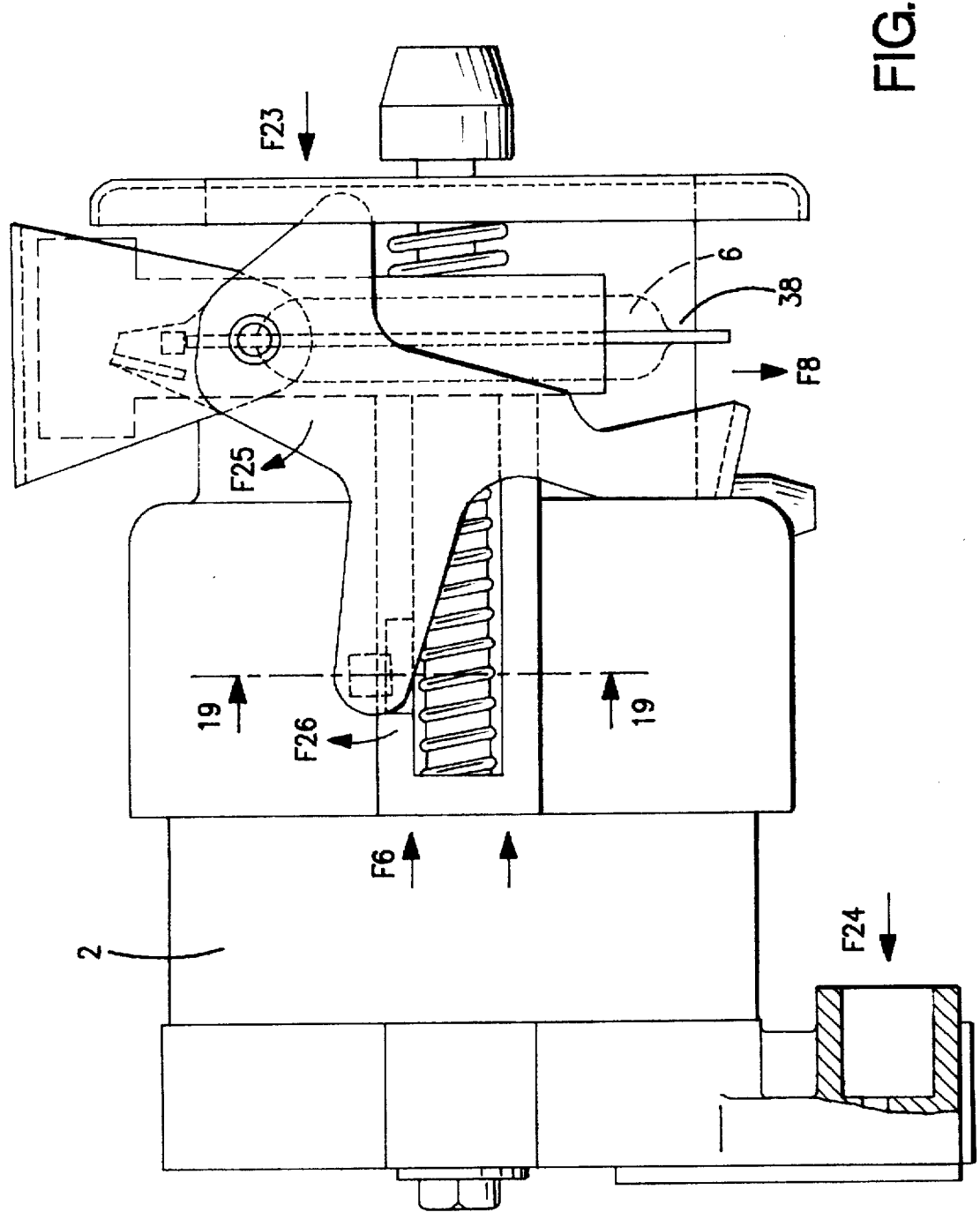
FIG. 16 shows a side view identical to FIG. 15, in which the body and the boiler are brought into closest to each other, the package being contained within the infusion chamber.

In FIG. 16, the approach between the body 2 and the boiler 3 is completed. This forms an infusion chamber 38 within which is located the package 6.

Figure 17:
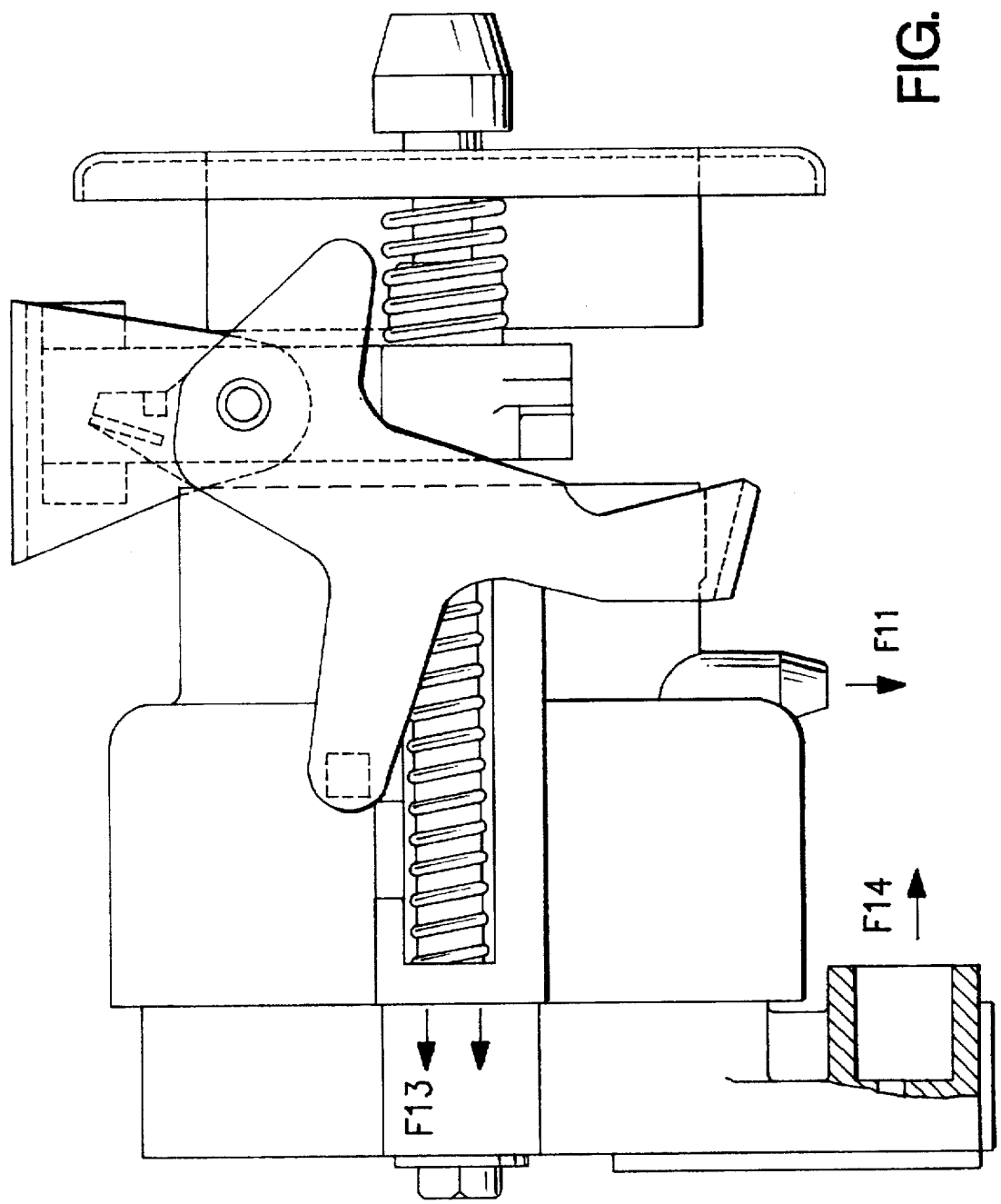
FIG. 17 shows a side view identical to FIG. 16, in which the body is spaced from the boiler, the package having been automatically ejected.
Figure 18:
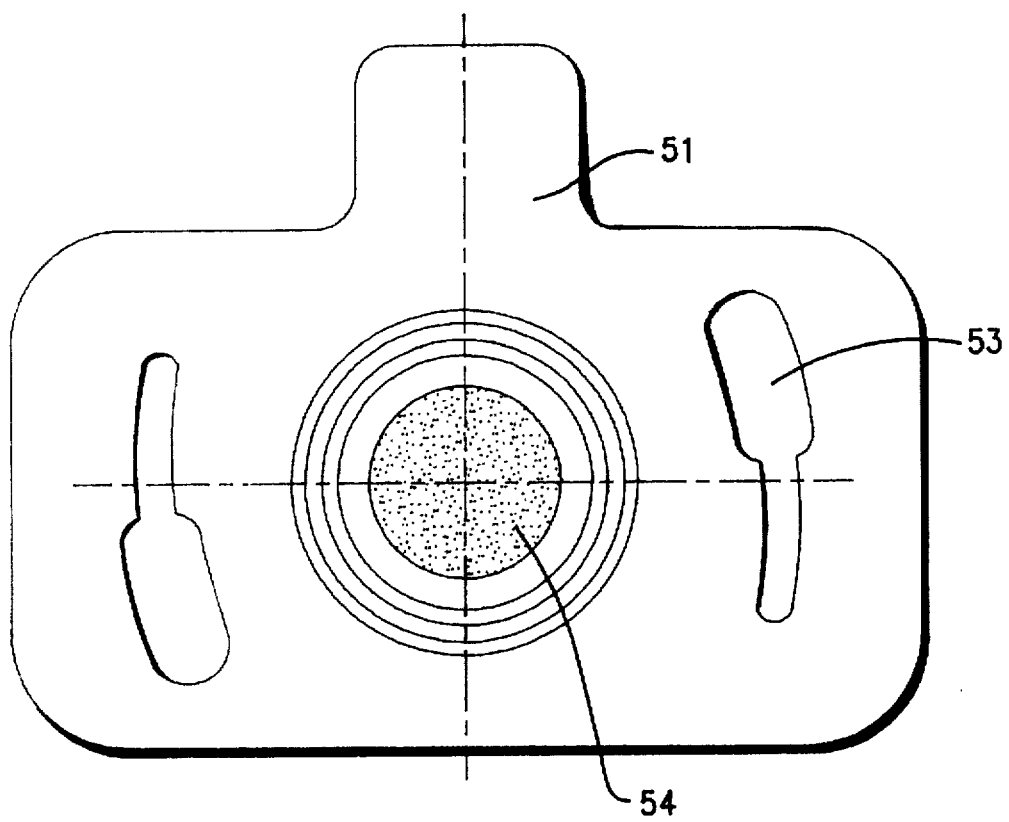
FIG. 18 shows a front view along the line C—C of FIG. 13 of the means for securing together the body and the boiler, carried by said boiler.

Finally, FIG. 17 shows the spacing of the body 2 relative to the boiler 3, along arrow F13, permitting the automatic ejection of the package 6, along the arrow F8, which follows the ejection of the infused liquid along F11.

This arrow F8 is shown in FIG. 16 whilst the body 2 and the boiler 3 are not yet spaced apart. This arrow F8 thus anticipates the automatic ejection movement of the package 6.

Thus, and as is well known in the art, the movement of the body 2 is effectuated by a piston-chamber assembly, not shown in the drawings, which is displaced by means of the water introduced into the interior of the chamber. This introduction takes place along F24, as is seen in FIG. 16, which permits displacing the body 2, along F6.

The reverse movement is effected by means of a water discharge F14 which permits displacement of the body 2, along F13.

The essence of the invention resides in the presence of a movable abutment 32 whose movement takes place in rotation about at least one substantially horizontal axis 41 and perpendicular to the longitudinal axis of the assembly of the body 2-boiler 3.

The swinging movement of the abutment 32, about its axis of rotation 41, takes place along F25, as is shown in FIG. 16. The reverse movement is not shown on the drawings but this takes place by simple gravity along F22 as is shown in FIG. 14.

Very precisely, the abutment is located at the infusion chamber 38 and is movable between two end positions. A first position is in the plane of chamber 38, which is to say that the abutment 32 is shown in FIGS. 14 and 15, which permits the abutment 32 to receive the package 6 which has been introduced. A second position is outside the plane of the infusion chamber 38, as is seen in FIG. 13 and also in FIGS. 16 and 17, in which said abutment 32 serves as ejection means for said package 6.

Thus, this abutment is constituted by a stirrup 32 which comprises two lateral uprights 42, substantially vertical, which each coact with an articulation axle 41 and which are connected to teach other by a crosspiece 43, which receives the package 6 when the abutment 32 is in the plane of the infusion chamber 38.

Nevertheless, so that the movement of the package 6, from its introduction to its ejection, which is to say according to the arrows F7 and F8, will be suitable, the automatic machine requires the presence of means 5 for maintaining it in position, which permits the package 6 always to remain in the plane of the infusion chamber 38.

These means 5 for maintaining in position therefore guide vertically from the top to the bottom said package 6, the movement being effected by simple gravity.

These means 5 for maintaining position are comprised by two vertically grooved elements in which the package 6 slides and is maintained in vertical position, each element being disposed on opposite sides of the infusion chamber 38, the grooves being disposed facing each other.

If as has been seen, the return movement, the reverse of F25, takes place by simple gravity, the movement along F25 is subjected to the movement of the body 2 relative to the boiler 3.

To this end, the abutment 32 comprises a control cam 44 which coacts with the boiler 3 when the body 2 and the boiler 3 approach each other.

Thus, and as seen in FIGS. 15 and 16, the control cam 44 does not coact directly with the boiler 13 but indirectly with an abutment 52 present in contact with the boiler 3 when the body 2 is emplaced at the machine as will be seen hereinafter. The approach of the abutment 52 and the control cam 44 takes place along F23.

The shape of the control cam 44 permits the swinging, along F25, of the assembly of the abutment 32 causing said abutment 32 to pass from the position in the plane to the position outside the plane of the infusion chamber 38.

This movement therefore permits emplacing the ejection means when the abutment 32 is no longer in the plane of the infusion chamber 38.

However, the package 6 cannot be ejected at that time because the body 2 and the boiler 3 contain it at the infusion chamber 38.

Of course, when the separation of the body 2 and the boiler 3 is programmed, as is seen in FIG. 17, the abutment 32 must remain absent from the plane of the infusion chamber 38 to permit the discharge of the package 6.

To do this, the abutment comprises a tongue 45 bearing a wedge 46, which coacts with the body 2, upon spacing of said body 2 and boiler 3, which slows the automatic return of the abutment 32 into the position in the plane of the infusion chamber 38 and promotes the automatic ejection of the package 6.

Figure 19:
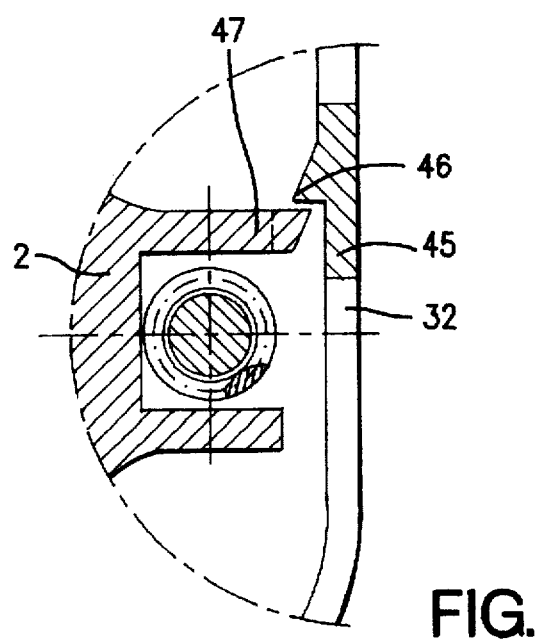
FIG. 19 shows a fragmentary cross sectional view on the line 19—19 of FIG. 16.

More precisely, and as seen in FIG. 19, the free end of the wedge 46 is slanted whilst the body 2 of the machine is provided with a wing 47, also slanted, the slanted portions coacting to facilitate the passage of the abutment 32 into the position outside the plane formed by the infusion chamber 38 and to prevent the passage of the abutment 32 into the position in the plane when the spacing of the body 2 and the boiler 3 is started. The movement of the slanted wedge 46 and of the slanted wing 47 takes place according to arrow F26.

For utilitarian and aesthetic purposes, a movable flap rotatable about an axis 41 that is substantially horizontal and perpendicular to the longitudinal axis of the machine, is provided. This flap 48 has for its purpose to prevent the introduction of a new package 6 when it is in the plane of the chamber 38, and to permit the introduction of said new package 6, when it is outside the plane of said infusion chamber 38.

Thus, the axis of rotation 41 is identical for the flap 48 and for the abutment 32.

The movement of the flap 48, between its position in the plane and its position outside the plane, takes place manually or automatically, along arrow F20. The reverse movement is not shown in the figures, but takes place automatically by means of a tongue 58 which has elastic properties and which is carried by the abutment 32.

This tongue 58 coacts with a wedge 57 present at the flap 48.

When the flap 48 is manipulated according to F20, the resilient tongue 58 forms according to F21 and permits the flap 48 to store a certain quantity of energy permitting it by means of its wedge 57 to return automatically into the position in the plane of the infusion chamber 38.

As is shown in FIG. 13, the body 2 is removable from the boiler 3.

The body 2 can be brought up and fixed at two principal points, along the arrows F18 and F19.

The securement of the body 2 to the boiler 3 takes place on the one hand at the abutment 52, and on the other hand at the female rapid connector 56, located in a lower position of the body 2.

As to the female rapid connector 56, the latter coacts with a male rapid connector 55 in which water is injected, along F10, to cause the body 2 and the boiler 3 to approach each other, along F24, and/or the water is evacuated, along F6, to permit a spacing of the body 2 relative to said boiler 3, along F13.

The second point of securement at the abutment 52 is effected by two male securement members 49, located at the abutment 52, which can be enclosed in the body of the boiler 3 at female securement members 50.

Thus, each male member 49 is formed by a longitudinal cylindrical body terminating at its free end by a lug of a larger diameter, the assembly being adapted to be positioned through a bore 53 by means of securement 51, located at the boiler 3.

This securement means 51 is mounted on a rotational axle 54 of each bore 53 which comprises an arcuate shape corresponding to the position of a male member 49, when this male member 49 is within a female member 50.

By a simple rotation of the securement means 51, each bore 53, in the form of an arc whose width is variable, permits, at its largest width, the passage of the lugs of the male members 49, whilst at its smaller width, it permits maintaining in position each male member 49.

We claim:

1. Automatic machine for the preparation of hot beverage infusions, comprising:

a group having a body (2) facing a boiler (3);

reception means (4) for an individual package (6) containing product (8) to be infused, said reception means having at least one retractable member (11), which when deployed in a substantially lower position, temporarily immobilizes said package (6) between the body (2) and the boiler (3);

means (5) for maintaining in position the package (6) having two substantially vertical lateral grooves (10) in which said package (6) slides and is maintained in vertical position when the reception means (4) are present; and automatic ejection means (4) for said package (6) having the retractable member (11), which when retracted relative to the passage of the individual package (6), permits ejection by mere gravity of the individual package (6), displacement of the individual package (6) being perpendicular to an axis of the machine.

2. Machine according to claim 1, wherein the body and the boiler together form an infusion chamber, the infusion chamber (38) having two half recesses (39 and 40), a half recess of the body (39) formed by a concave surface of the body (2), a half recess of the boiler (40) formed by a concave surface of the boiler (3), said surface of the body and said surface of the boiler facing each other; the concave surface of the body and the concave surface of the boiler defining said infusion chamber (38), and the individual package (6) having sealing means (13) such that, when the infusion chamber (38) is defined, the individual package (6) is inserted between the two half recesses (39 and 40).

3. Machine according to claim 2, which uses packages (6) of products to be infused (8), of the individually packaged dose type, formed by a flexible central portion (12) enclosing the product to be infused (8) and a peripheral portion forming a sealing and rigidification edge, wherein the peripheral portion of said package (6) serves as the sealing means (13) between the half recess (39) of the body (2) and the half recess (40) of the boiler (3) when the two concave surfaces approach each other.

4. Machine according to claim 1, wherein the body (2) and the boiler (3) each have a filter (14 or 15) including a plate at their respective half recesses (39 and 40), the filters (14 and 15) having a shape which permits enclosing at least partially a central portion (12) of the package (6), when the infusion chamber (38) is defined.

5. Machine according to claim 1, further comprising wetting means (7) located in the body (2) toward the half recess (39) of the body, the wetting means (7) including:

the filter (14) of the half recess (39) of the body (2), and a membrane valve (17) disposed in the space comprised between said half recess (39) of the body (2) and said filter (14) of the body.

6. Machine according to claim 5, wherein the filter (14) of the body (2) is pierced transversely by at least one hole (16), said filter of the body comprising, against a surface thereof oriented in the direction of said body (2), the membrane valve (17) having a concavity forming a space (18) delimited by said filter (14) of the body, the assembly of the at least one hole (16) opening into the space (18).

7. Machine according to claim 5, wherein the membrane valve (17) is movable between two positions, a concave position preventing passage of the infused liquid (19), and a flat position permitting the passage of said infused liquid (19) according to pressure applied thereto.

8. Machine according to claim 1, wherein a half recess (39) of the body (2) is provided with an outlet conduit (20) for infused liquid (19), said outlet conduit having an opening disposed between said half recess (39) of the body and a membrane valve (17).

9. Machine according to claim 1, wherein the retractable member (11) is an abutment forming, in an extended position, the reception means (4), and, in retracted position, the automatic ejection means (4) by simple gravity of the package (6), the retractable member (11) being mounted on a guided axle (22), against the force of a return spring (23), a free end of the guided axle (22) coacting with a control cam (24) mounted against an action of a spring (25).

10. Machine according to claim 1, wherein the position maintaining means (5) of the package (6) are secured to at least one axle (29), mounted against a force of a spring (30), said spring (30) maintaining the maintaining means in position (5) midway between the body (2) and the boiler (3), so as to unstick said package when spacing between said body (2) and said boiler (3) is at a maximum.

11. Machine according to claim 1, further comprising a fixed piston (1), the body (2) being movable relative to the fixed piston (1), wherein the body (2) has an inlet and an outlet conduit (21) for water emptying into the chamber (27), such that the group formed by the body (2) and the fixed piston (1) comprises a simple jack which decreases or increases the volume of the chamber (27) through the outlet or inlet of water via the conduit (21), which spaces or brings together horizontally the body (2) and the boiler (3).

12. Machine according to claim 11, wherein the fixed piston (1) has an abutment (26) coacting with a control cam (24) when the chamber (27) is at a minimum, such that the reception means (4) are armed and the automatic ejection means (4) are disarmed, the retractable abutment (11) taking an extended position permitting reception of a new package (6).

13. Machine according to claim 1, wherein the boiler (3) has an abutment (28) which serves as a buffer for the reception means (4) when the body (2) and the boiler (3) approach each other such that said reception means (4) are disarmed and the automatic ejection means (4) are armed, the retractable abutment (11) taking a retracted position.

14. Machine according to claim 1, wherein at least one of a half recess (39) of the body (2) and a half recess (40) of the boiler (3) has a flexible element (31), which absorbs the variations of volume of the package (6).

15. Machine according to claim 1, wherein the body (2) and the boiler (3) are disposed along a substantially horizontal longitudinal axis.

16. Machine according to claim 1 wherein the body (2) faces the boiler (3), along a horizontal axis, wherein one of the body (2) and the boiler (3) has a movable abutment (32) rotatable about at least one axis (41) substantially horizontal and perpendicular to the horizontal axis of an assembly of the body (2) and the boiler (3), the abutment (32) being located at the infusion chamber (38) and movable between a position in a plane of said infusion chamber (38), the abutment (32) serving as reception means for the package (6), and a position outside the plane of the infusion chamber (38), said abutment (32) then serving as said automatic ejection means for said package (6).

17. Machine according to claim 16, wherein the abutment (32) comprises a stirrup (32) having two substantially vertical lateral uprights (42) which coact each with an articulation axle (41), and which are connected to each other by a crosspiece (43) which receives the package (6) when the abutment (32) is in the plane of the infusion chamber (38).

18. Machine according to claim 16, wherein the position maintaining means (5) for the package (6) are present at the abutment (32) and guide substantially vertically from top to bottom said package (6).

19. Machine according to claim 18, wherein the position maintaining means (5) comprise two vertically grooved elements, in which the package (6) slides and is maintained in vertical position, each vertically grooved element being disposed on opposite sides of the infusion chamber (38).

20. Machine according to claim 16, wherein the abutment (32) comprises at least one control cam (44) which coacts with one of the body (2) and the boiler (3) when the body and the boiler are together, the at least one control cam (44) controlling the abutment (32) during movement from the position in the plane to the position outside the plane of the infusion chamber (38), a reverse movement taking place by simple gravity when said body (2) and said boiler (3) move away from each other.

21. Machine according to claim 16, wherein the abutment (32) comprises at least one tongue (45) bearing a wedge (46), said wedge coacting with one of the body (2) and the boiler (3), during movement apart of said body (2) and said boiler (3), said wedge retarding automatic return of the abutment (32) in position in the plane of the infusion chamber (38) and facilitates the ejection of the package (6).

22. Machine according to claim 21, wherein a free end of the wedge (46) is slanted and one of the body (2) and the boiler (3) of the machine has a slanted wing (47), slanted portions of said wedge (46) and said wing (47) coacting to facilitate the passage of the abutment (32) into the position outside the plane of the infusion chamber (38), and to prevent the passage of the abutment (32) into the position in said plane.

23. Machine according to claim 16, wherein a flap (48) is movable in rotation, about at least one substantially horizontal axis (41) perpendicular to the horizontal axis of the body and the boiler, between a position in the plane of the infusion chamber (38), preventing the introduction of a new package (6), and a position outside the plane permitting the introduction of the new package (6).

24. Machine according to claim 23, wherein the axis of rotation (41) of the abutment (32) and the axis of rotation (41) of the flap (48) are coaxial.

25. Machine according to claim 16, wherein the body (2) is removable relative to the boiler (3).

* * * * *